(12) United States Patent
Balscheit

(10) Patent No.: US 7,617,626 B2
(45) Date of Patent: Nov. 17, 2009

(54) DISPLAY TRAILER

(76) Inventor: Marcus Antony Balscheit, 1-3 Inkerman St., St. Kilda, Victoria (AU) 3182

( * ) Notice: Subject to any disclaimer, the term of this patent is extended or adjusted under 35 U.S.C. 154(b) by 226 days.

(21) Appl. No.: 11/398,066

(22) Filed: Apr. 5, 2006

(65) Prior Publication Data

US 2006/0226625 A1 Oct. 12, 2006

(30) Foreign Application Priority Data

Apr. 6, 2005 (AU) ............................. 2005201549

(51) Int. Cl.
*G09F 21/04* (2006.01)
(52) U.S. Cl. ...................... 40/590; 40/591; 40/606.18
(58) Field of Classification Search .................. 40/590, 40/591, 439, 479, 413, 477, 602; 296/21
See application file for complete search history.

(56) References Cited

U.S. PATENT DOCUMENTS

| | | | | |
|---|---|---|---|---|
| 2,147,890 A | * | 2/1939 | Glasgow | 248/282.1 |
| 3,088,235 A | * | 5/1963 | Kies | 40/477 |
| 3,986,722 A | * | 10/1976 | Patterson | 280/16 |
| 4,041,452 A | * | 8/1977 | Moya | 340/432 |
| 4,910,898 A | * | 3/1990 | Hector | 40/479 |
| 6,769,950 B1 | * | 8/2004 | Suciu | 446/176 |

FOREIGN PATENT DOCUMENTS

| | | | |
|---|---|---|---|
| AU | 2003231703 | | 3/2004 |
| FR | 2630990 | | 11/1989 |
| FR | 2797707 | | 2/2001 |
| FR | 2821970 | | 9/2002 |
| GB | 0374270 | * | 6/1932 |
| GB | 441543 | * | 1/1936 |
| IT | 448054 | * | 6/1949 |
| JP | 2002132198 | | 9/2002 |

OTHER PUBLICATIONS

European Examination Report for Application No. 06251905.3-2214.

* cited by examiner

*Primary Examiner*—Cassandra Davis
(74) *Attorney, Agent, or Firm*—Harness, Dickey & Pierce, P.L.C.

(57) ABSTRACT

An advertising display trailer for a bicycle, the trailer including a base, a coupling for coupling the base to the bicycle, and a display body mounted to the base is disclosed. The display body may be configured so as to pivot relative to the base. A display trailer including a base and a structure mounted to the base for carrying a display body such that the display body is able to pivot relative to the base. Also disclosed is a bicycle trailer for carrying an advertising sign, wherein the trailer has a base adapted to carry the advertising sign such that the sign extends generally upwardly from the base. In one form, a structure of the trailer is such that it is designed only to carry the advertising sign.

12 Claims, 14 Drawing Sheets

DISPLAY TRAILER

CROSS-REFERENCE TO RELATED APPLICATIONS

This application claims the benefit of Australian Patent Application Number 2005201549, filed Apr. 6, 2005. The disclosure of the above application is incorporated herein by reference.

FIELD

The present disclosure relates to a display trailer and, more particularly, to an advertising display trailer for a bicycle.

BACKGROUND

The statements in this section merely provide background information related to the present disclosure and may not constitute prior art.

Advertising takes many forms, and advertisers look for new ways to advertise so as to effectively gain the attention of intended viewers. Traditionally, it has been common to have advertising in fixed places such as on billboards, rotating signs mounted on buildings, and posters stuck on walls. However, more recently, it has also become common for advertisers to use moving advertisements, such as on the sides of public transport, and on the rear of taxis. Such moving advertisements make efficient use of advertising space available on transport already serving a primary purpose, e.g. transporting people, and thus there is little or no wastage of energy associated with adapting those transport vehicles to have such advertising, at least in so far as propulsion of those vehicles is concerned.

However, as some advertisers demand more space as well as the ability to target specific areas, specific viewers or a specific route, it has become common to use mobile advertising. One example of known mobile advertising is in the form of a truck having large signage, typically mounted behind a cab of the truck. The truck is driven with the sole purpose of displaying the signage, to other drivers in traffic as well as to pedestrians and other passers by. It has also been proposed to provide mobile advertising in the form of an advertising trailer which is towed behind an automobile. However, these forms of mobile advertising have the disadvantage that there is wastage of energy and unnecessary production of pollution, as the vehicles serve the sole purpose of transporting the signage. Also, the vehicles add to congestion of motor traffic and are subject themselves to traffic jams, such that the advertising may be viewed by only a limited number of viewers also stuck in traffic. An additional disadvantage is that viewers of these kinds of mobile advertising may develop a negative association with the advertising, owing to their frustration at being in traffic, an otherwise pointless vehicle delaying them, or simply the needless pollution.

Examples of the present invention seek to overcome or at least alleviate one or more of the disadvantages discussed above.

SUMMARY

In accordance with one aspect of the present invention, there is provided an advertising display trailer for a bicycle, the trailer including a base, a coupling for coupling the base to the bicycle, and a display body mounted to the base.

Preferably, the display body is able to pivot relative to the base.

In accordance with another aspect of the present invention, there is provided a display trailer including a base and a structure mounted to the base for carrying a display body such that the display body is able to pivot relative to the base.

Preferably, the trailer includes a biasing element which opposes pivoting of the display body relative to the base. More preferably, the biasing element biases the display body to a rest position. In one form, when the display body is in the rest position, it lies in a plane substantially parallel to a forward direction of travel of the bicycle. Preferably, the biasing element opposes pivoting of the display body relative to the base with a force which increases in magnitude with pivotal displacement of the display body from the rest position.

Preferably, the display body is pivotal about a substantially vertical axis.

Preferably, the display body is pivotal relative to the base about an axis spaced from a central axis of the display body. More preferably, the pivot axis about which the display body is pivotal relative to the base is parallel to the central axis of the display body. In one form, the display body extends either side of the pivotal axis.

Preferably, the trailer is provided with means for preventing tipping of the trailer in wind. More preferably, the means for preventing tipping of the trailer in wind includes means for releasing wind pressure against the display body. In one form, the means for preventing tipping of the trailer in wind includes the display body being able to pivot relative to the base.

Preferably, the display body is in the form of an advertising sign.

Preferably, the display trailer further includes a storage container, the container being adapted for seating within the base of the trailer so as to store cargo and/or ballast beneath the display body. More preferably, the container has a compartment for containing ballast centrally beneath the display body.

In yet another aspect of the present invention, there is provided a bicycle trailer for carrying an advertising sign, wherein the trailer has a base adapted to carry the advertising sign such that the sign extends generally upwardly from the base.

Preferably, a structure of the trailer is such that it is designed only to carry the advertising sign.

Preferably, the trailer includes a frame upstanding from the base for pivotally mounting the advertising sign to the frame.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
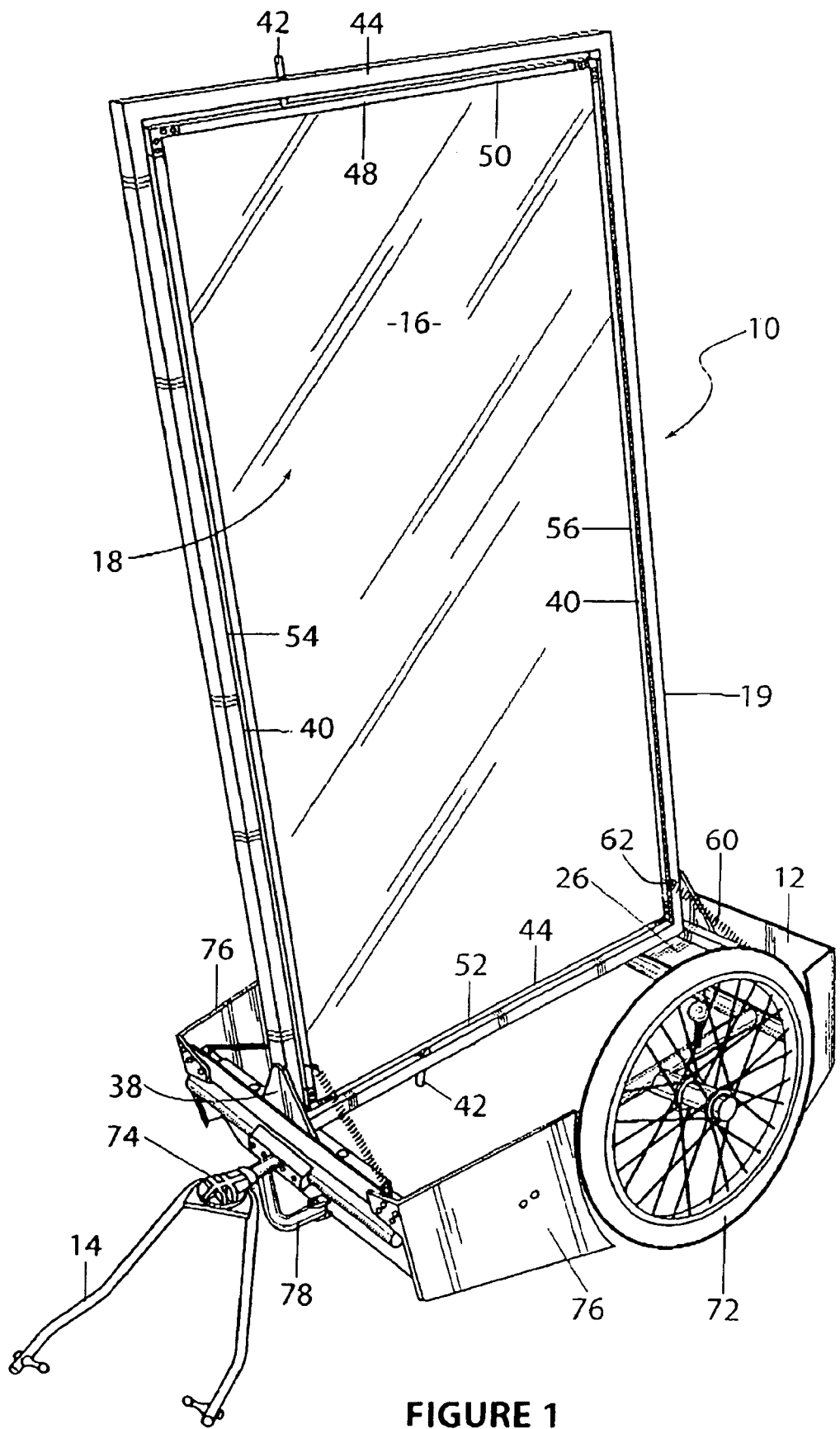
FIG. 1 is a front/left side perspective view of a trailer for a bicycle.
Figure 2:
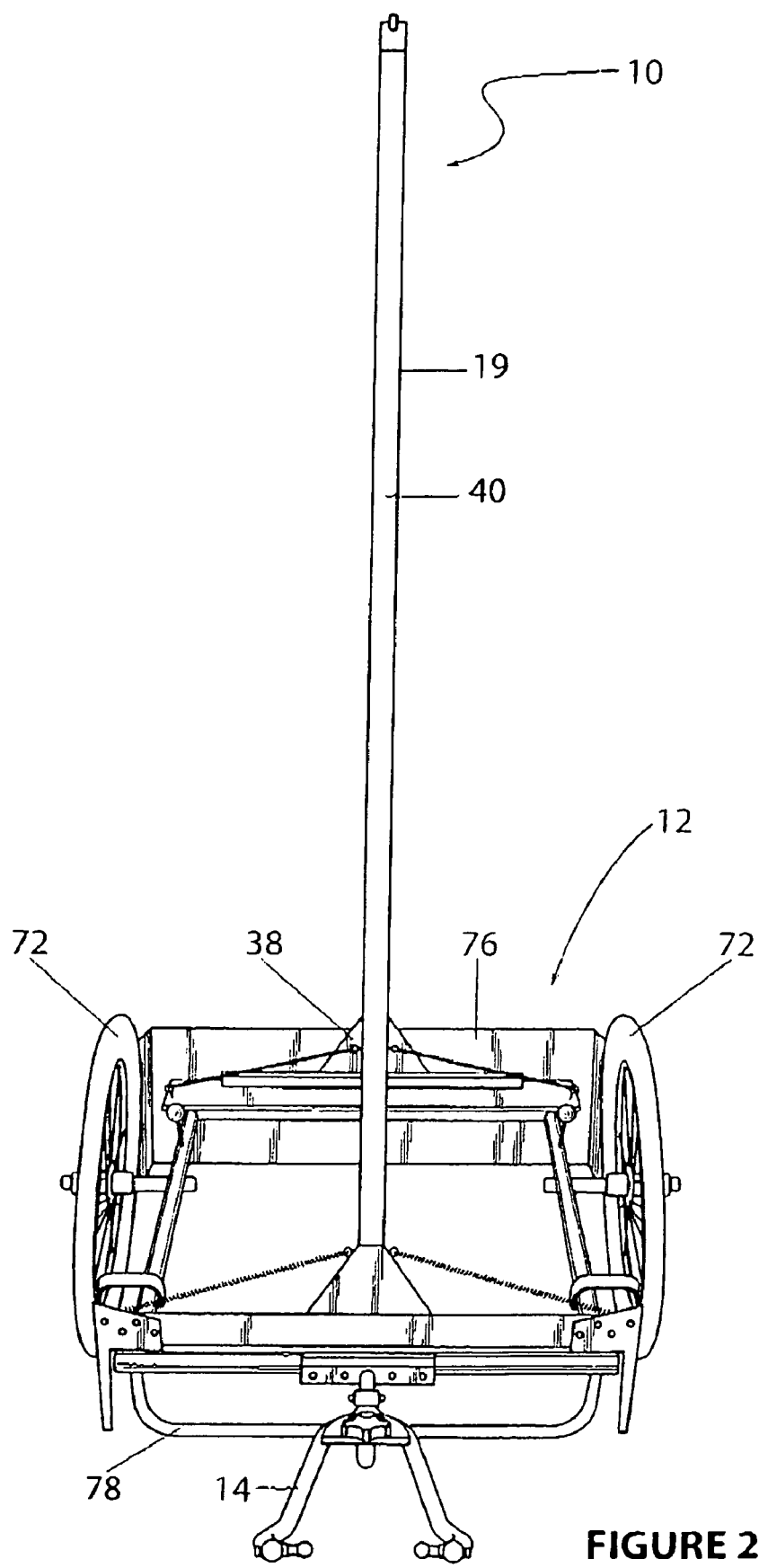
FIG. 2 is a front view of the trailer shown in FIG. 1.
Figure 3:
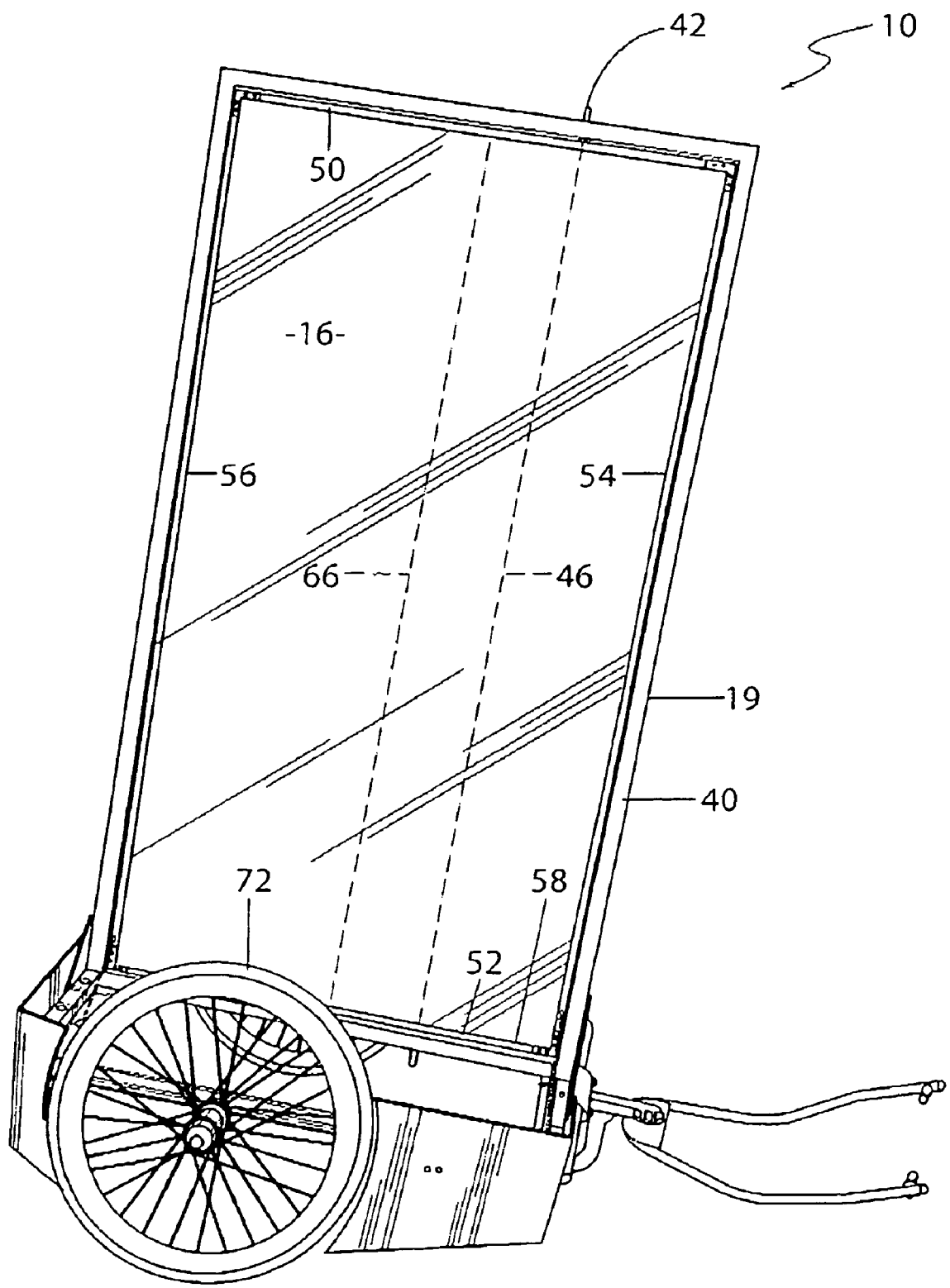
FIG. 3 is a right side view of the trailer shown in FIGS. 1 and 2.

FIG. 1 shows a trailer 10 for a bicycle (not shown), the trailer 10 including a base 12, a coupling 14 for coupling the base 12 to the bicycle, and a display body in the form of an advertising sign 16 mounted to extend upwardly from the base 12. The advertising sign 16 displays advertising 18 which can be seen by viewers when the trailer 10 is towed behind the bicycle.

Figure 5:
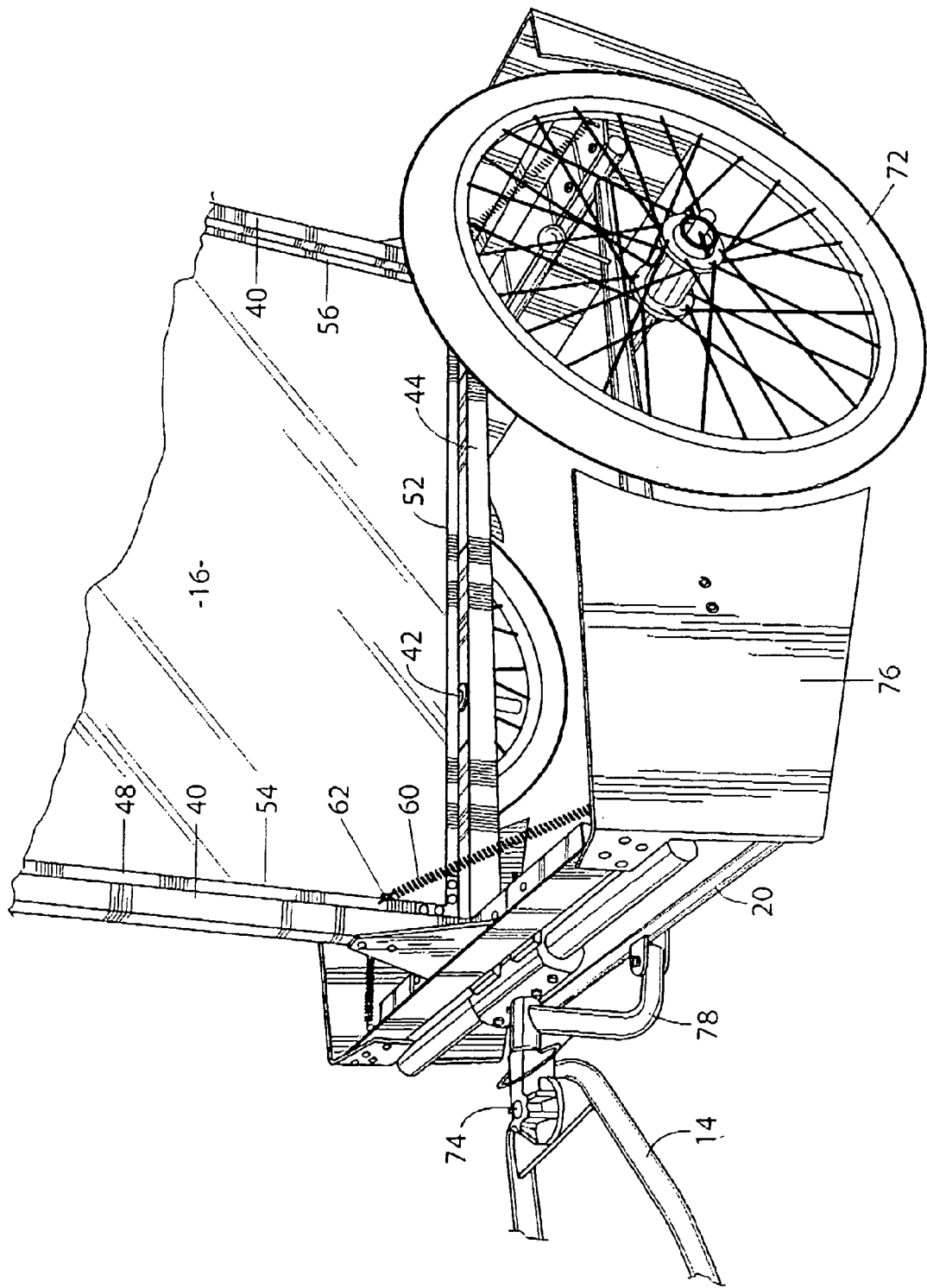
FIG. 5 is a front/left side perspective view of a base of the trailer shown in FIGS. 1 to 4.
Figure 6:
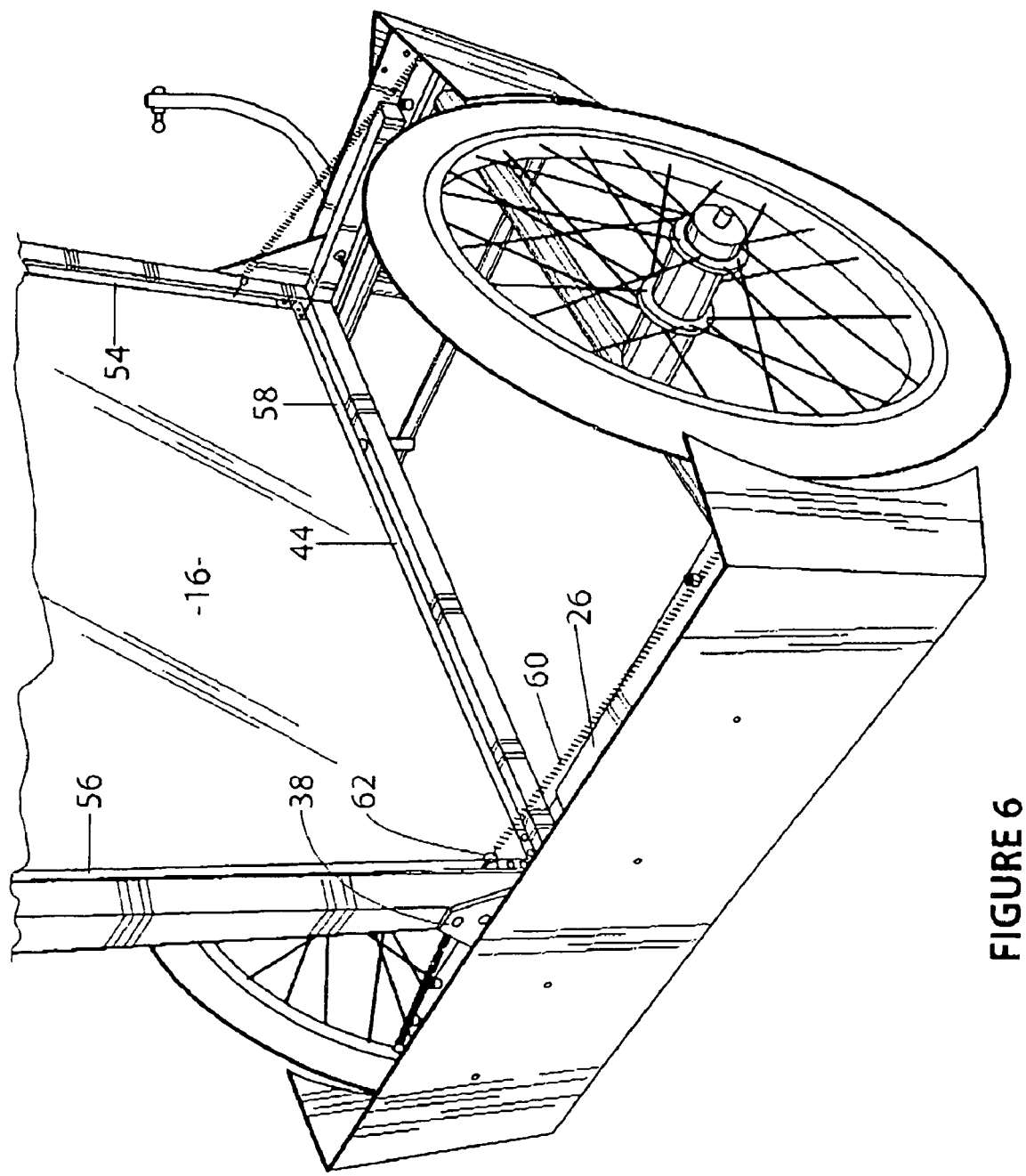
FIG. 6 is a rear/right side perspective view of the base of the trailer shown in FIGS. 1 to 5.
Figure 7:
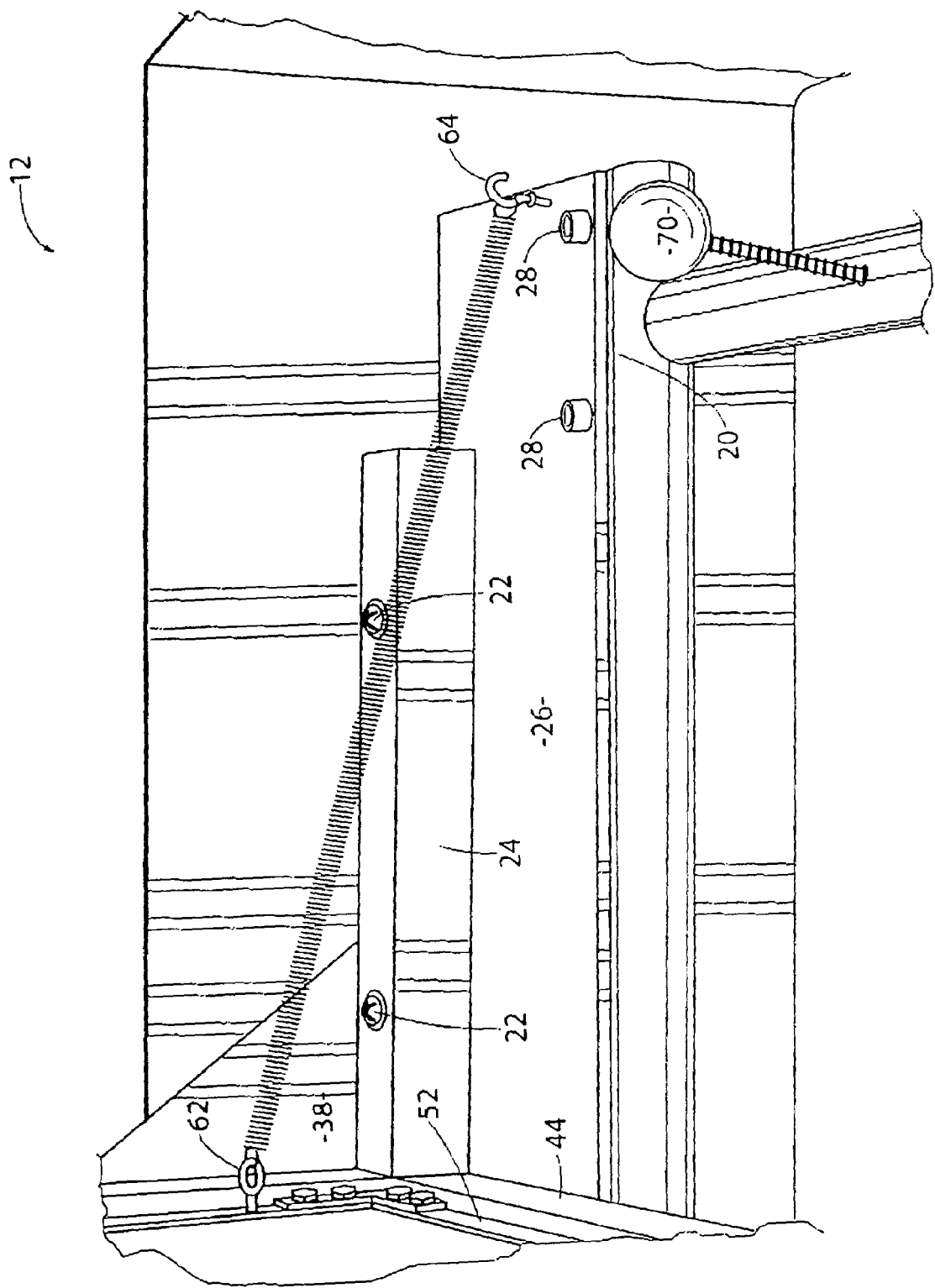
FIG. 7 is a close-up view of an inner rear portion of the base of the trailer shown in FIGS. 1 to 6.
Figure 11:
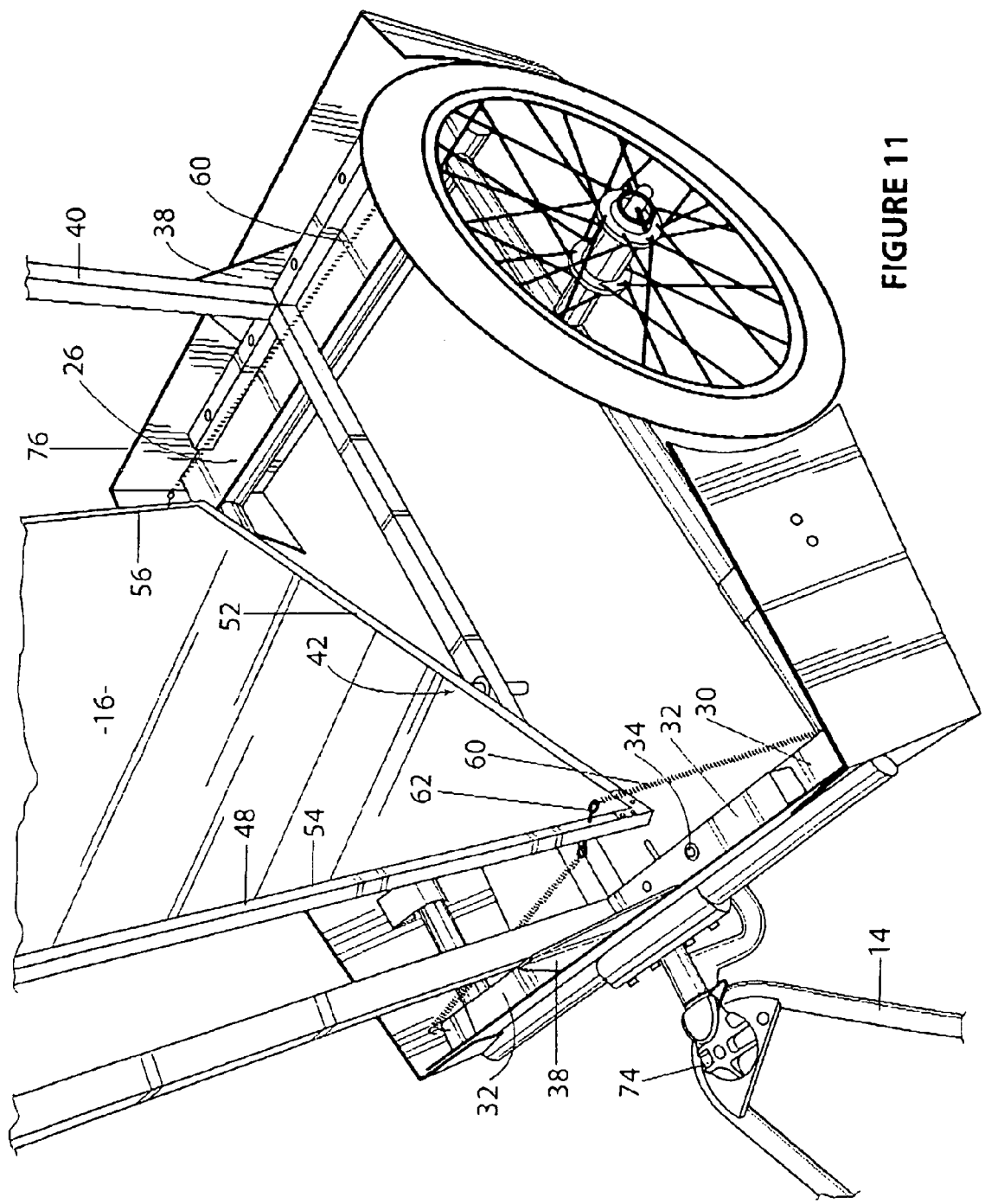
FIG. 11 is a top/left side perspective view of the base of the trailer of FIGS. 1 to 10, showing the advertising sign of the trailer in a pivotally displaced condition.

A sign support structure in the form of a frame 19 is mounted to a chassis 20 of the base 12 by way of screws 22 (see FIGS. 5 and 7), and serves to carry the advertising sign 16 such that the sign 16 is pivotal relative to the frame 19, and thus also the base 12. With particular reference to the example depicted in the drawings, the frame 19 is mounted to the chassis 20 by way of rear leg portions 24 of the frame 19 which are bolted to a rear plate 26. The rear plate 26 is, in turn, bolted to the chassis 20 by way of bolts 28 (as shown in FIG. 7) at a rear end of the base 12. A similar arrangement is used at a front end of the base 12, where the frame 19 is attached to the chassis 20 by way of a front plate member 30. With specific reference to FIGS. 11 and 12, front leg portions 32 of the frame 19 are attached to the front plate member 30 by way of screws 34, and the front plate member 30 is bolted to the chassis 20 by bolts 36. Vertical plates 38 are used at the front and rear of the frame 19 to strengthen the mounting of vertical members 40 of the frame 19 relative to the leg portions 24, 32.

Figure 8:
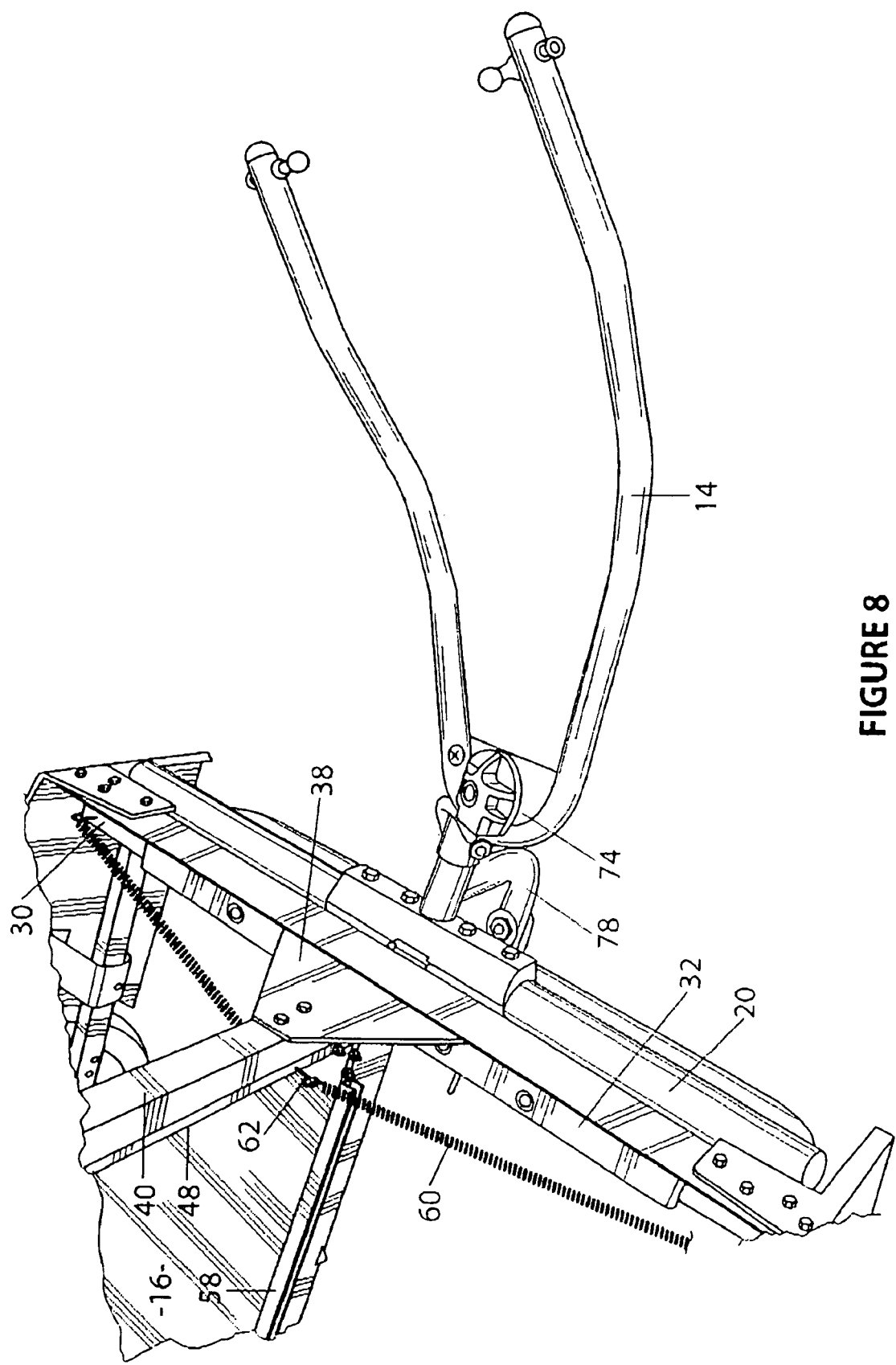
FIG. 8 is a top perspective view of a front portion of the trailer shown in FIGS. 1 to 7.

The advertising sign 16 is mounted within the frame 19 by way of upper and lower stub axles 42 which are received in correspondingly positioned apertures in upper and lower framing members 44 of the frame 19, as shown in FIG. 1. Accordingly, the advertising sign 16 is able to pivot relative to the frame 19, and thus also the base 12, about a pivot axis 46 which extends between the upper and lower stub axles 42. The stub axles 42 are attached to a sign frame 48 which extends around the periphery of the sign 16 so as to prevent or at least reduce bending of the sign 16. The sign frame 48 is constructed of an upper member 50, lower member 52, front member 54 and rear member 58 which are placed along corresponding edges of the sign 16, and are bolted together at the four corners of the sign 16, as shown in FIGS. 3 to 5 and 11. Advantageously, a reinforcing length 58 having a U-shaped cross-section (see FIGS. 8 and 12) is attached to the lower member 52 so as to assist in preventing bending of that member 52.

Biasing elements in the form of springs 60 me provided near front and rear edges of the advertising sign 16 so that, in the absence of other forces (such as from cross wind), the advertising sign 16 remains in a rest position, as shown in FIGS. 1 to 8. The springs 60 are anchored between eyelets 62 threaded into the sign frame 58 and hooks 64 threaded into the front and rear plate members 26, 30, as shown most clearly in FIGS. 7 and 8. The resilience of the springs 60 may be changed according to the materials and configuration of the advertising sign 16, the conditions in which the trailer 10 is to be used, and/or the desired amount of pivoting for a given magnitude of wind.

Figure 4:
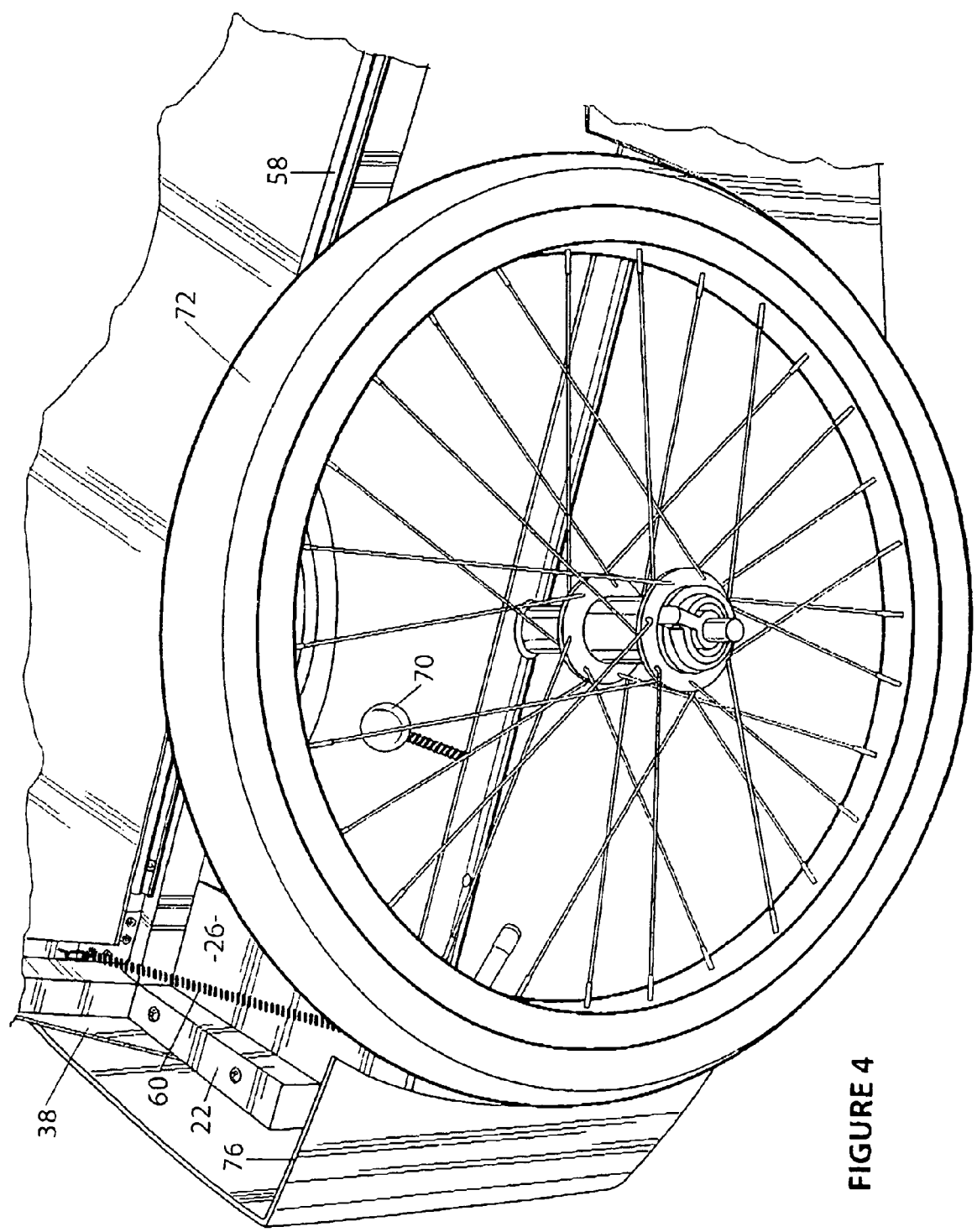
FIG. 4 is a close-up right side perspective view of a wheel of the trailer shown in FIGS. 1 to 3.
Figure 9:
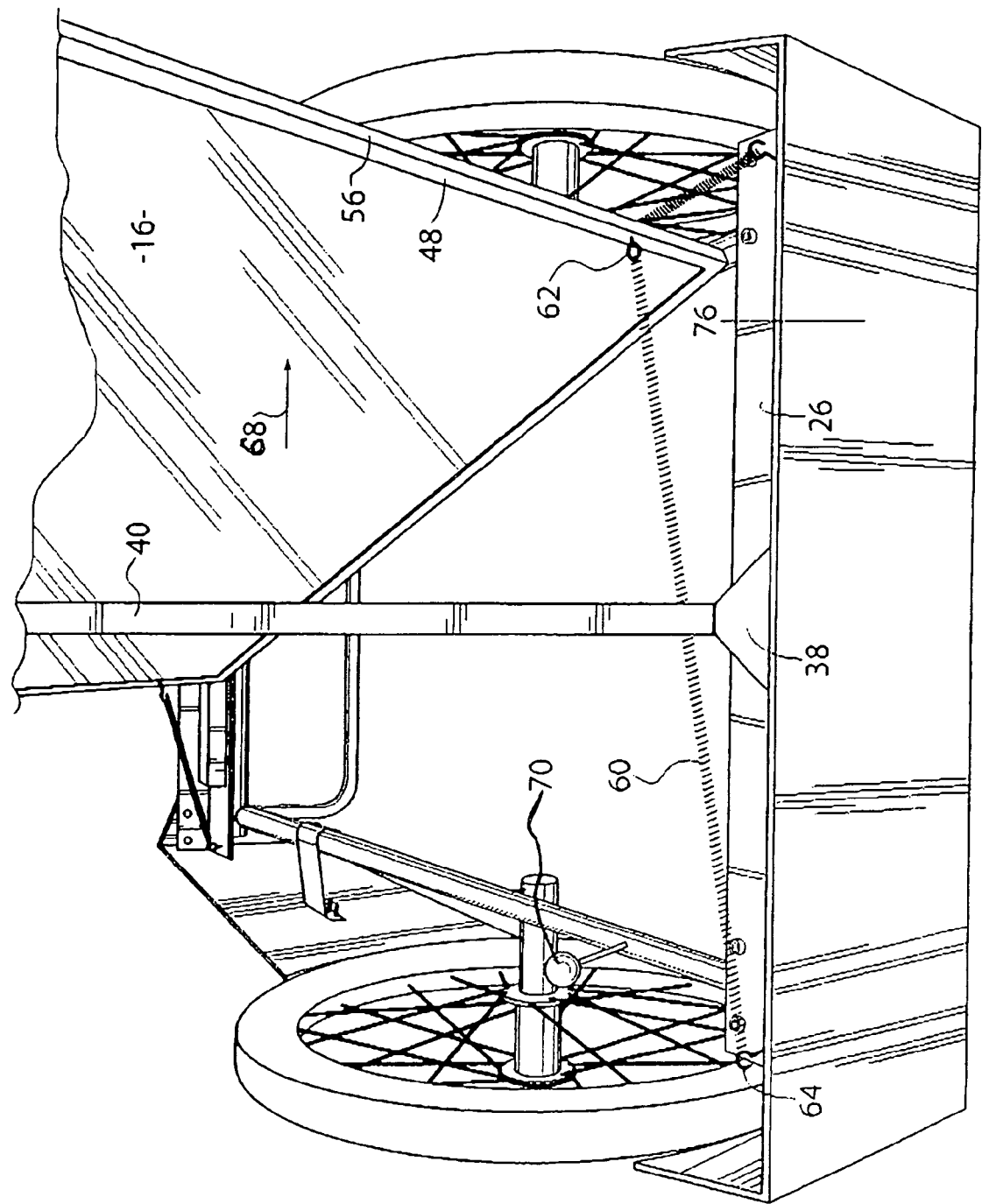
FIG. 9 is a top/rear perspective view of the trailer of FIGS. 1 to 8, showing an advertising sign of the trailer in a pivotally displaced condition.
Figure 10:
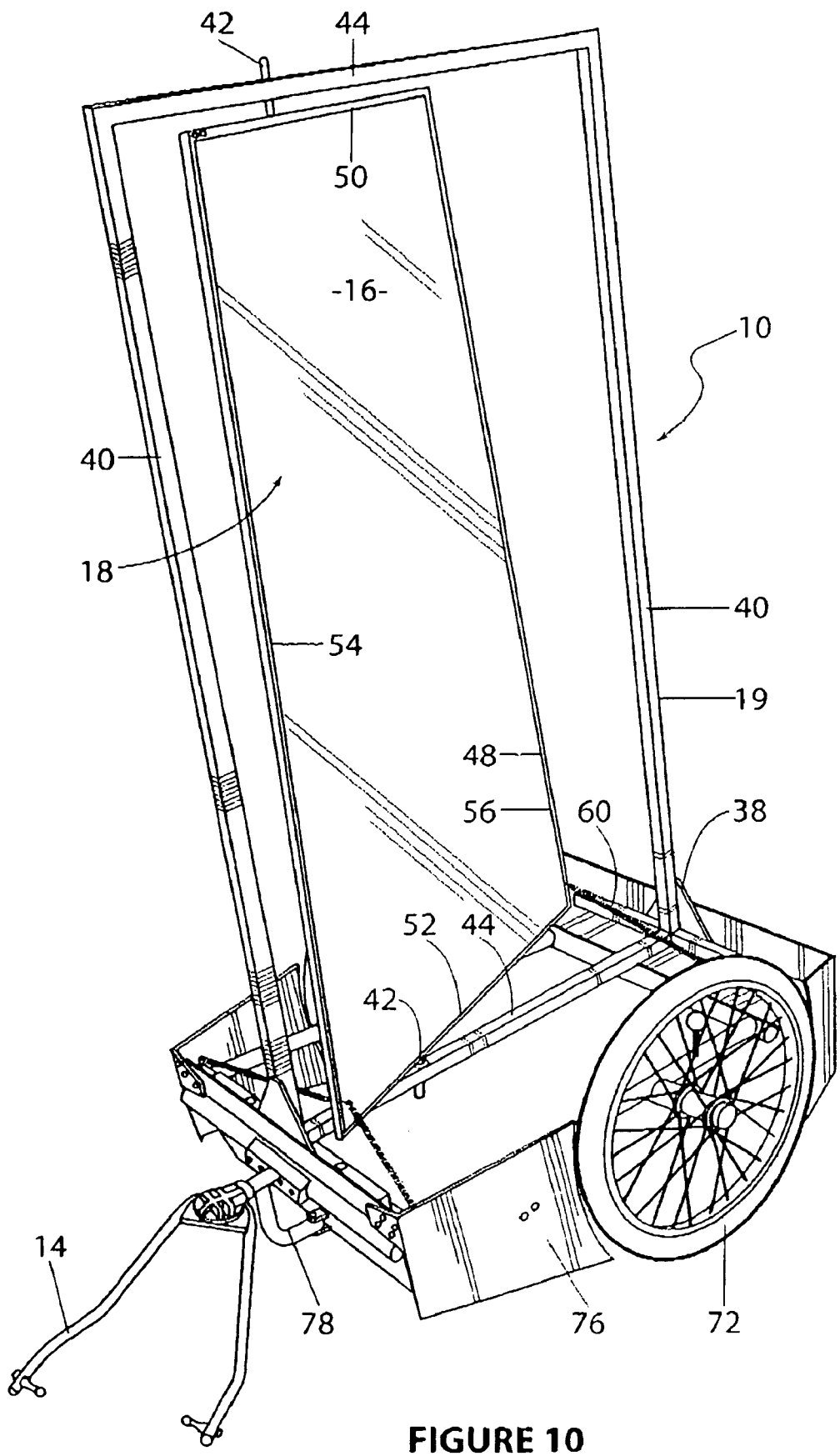
FIG. 10 is a front/left side perspective view of the trailer of FIGS. 1 to 9, showing the advertising sign of the trailer in a pivotally displaced condition.

By virtue of the pivot axis 46 being spaced forwardly from a central axis 66 of the advertising sign 16 (see FIG. 3), when the trailer is subjected to a cross-wind, the larger surface area on the trailing side of the pivot axis 46 (i.e., in comparison to the smaller surface area on the leading side of the pivot axis 46) results in force on the trailing side of the pivot axis 46 being greater than the force on the leading side of the pivot axis 46, such that the advertising sign 16 pivots about the pivot axis 46. For example, as shown in FIG. 9, if the trailer 10 is subjected to a cross-wind from left to right, as indicated by arrow 68, the advertising sign 16 will pivot as shown. Advantageously, as the force exerted by the springs 60 is proportional to the extension of the springs 60, the opposing forces exerted by the springs 60 under extension will increase in magnitude with pivotal displacement of the advertising sign 16 from the rest position, so that the springs 60 may be suitably sized to prevent abrupt contact between the advertising sign 16 and stops 70, at least in normal operating conditions. The stops 70, as shown in FIGS. 4, 7 and 9, prevent excessive pivoting of the advertising sign 16 to avoid contact between the sign 16 and wheels 72 of the trailer 10. The wheels 72 are attached to either side of the base 12 by way of stub axles, as shown in the underside view of FIG. 12.

By enabling pivoting of the advertising sign 16 relative to the base 12 in this way, there is provided means for releasing wind pressure acting against the sign 16 from cross winds to prevent tipping of the trailer 10. The base 12 may also be provided with additional means for preventing tipping of the trailer, for example by attaching weights to the chassis 20 so as to lower a centre of gravity of the trailer.

Figure 13:
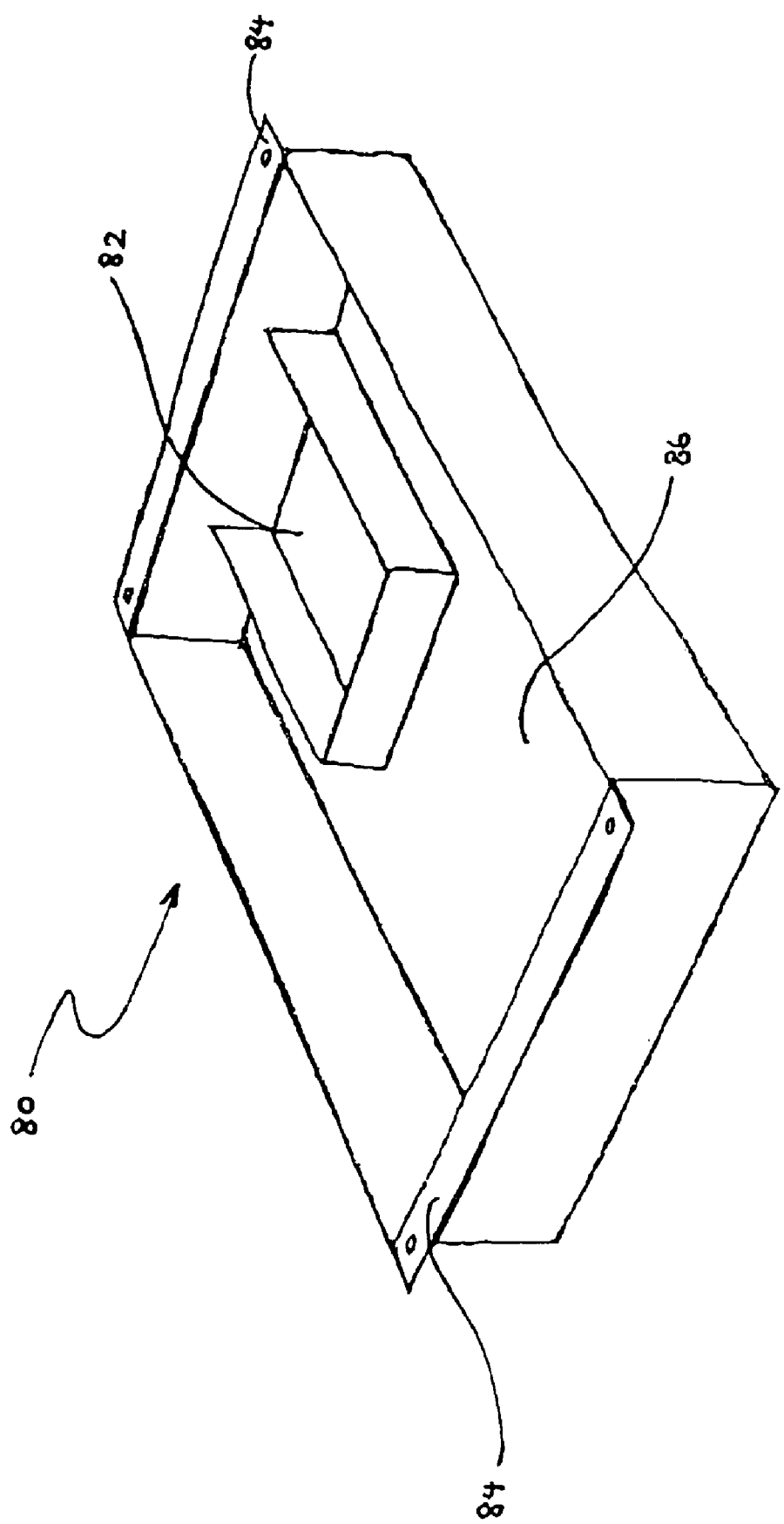
FIG. 13 is a perspective view of a product sample/ballast container for the trailer shown in FIGS. 1 to 12.
Figure 14:
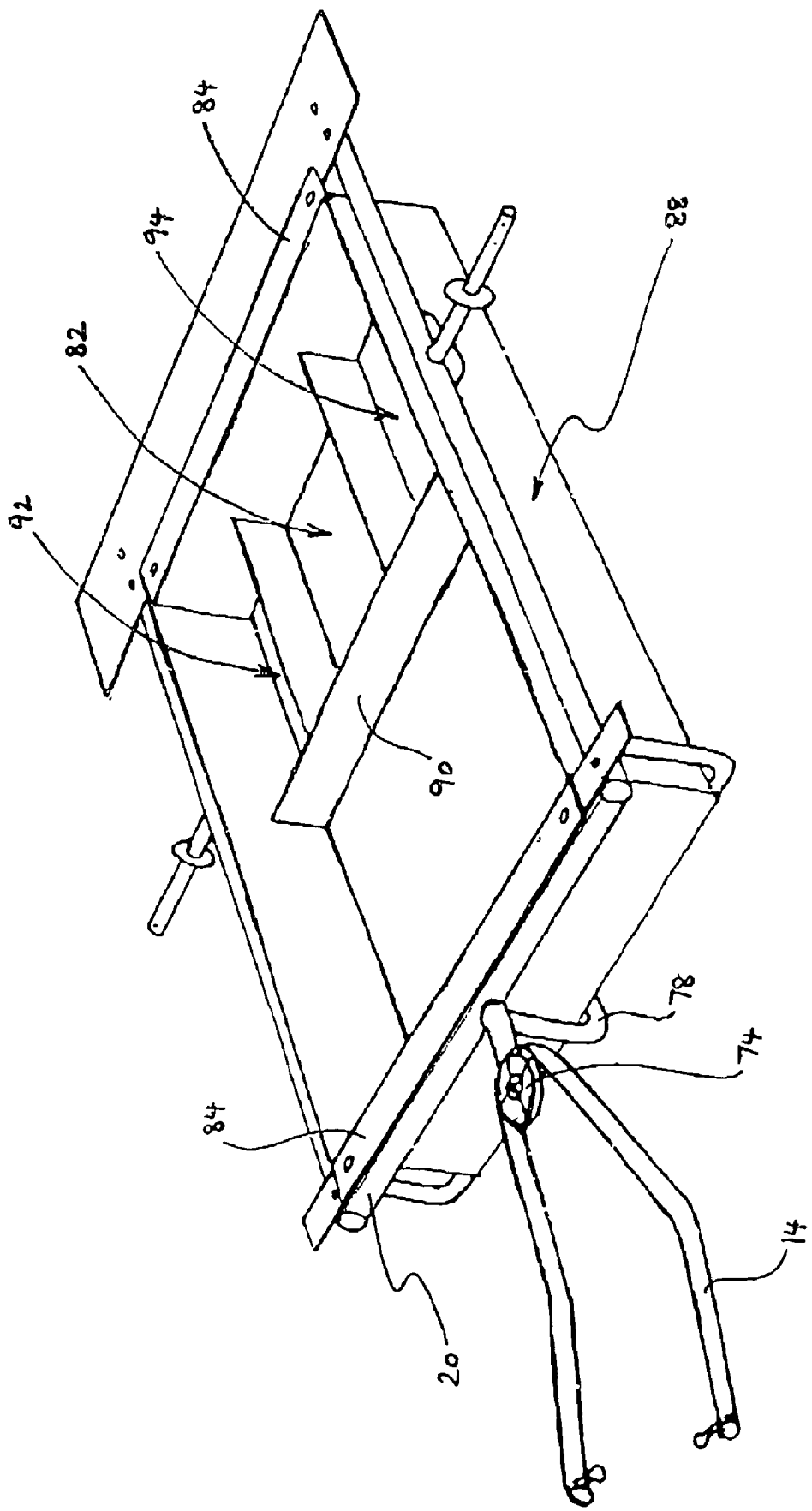
FIG. 14 is a perspective view of a product sample/ballast container, similar to the one shown in FIG. 13, shown fitted to the base of a trailer.

In one form of the invention, a product sample container 80, such as the one shown in FIG. 13, is provided for mounting to the chassis 20 of the base 12 of the trailer 10. The product sample container 80 has a central ballast compartment 82 for containing ballast material, and chassis-connecting plates 84 for facilitating seating of the container 80 within the chassis 20. The remainder of the storage space 86 outside of the ballast compartment 82 may be used to store cargo which may be, for example, samples of a product advertised on the advertising sign 16. FIG. 14 shows a product sample container 88 seated within the chassis 20 of the trailer 10. The product sample container 88 shown in FIG. 14 is similar to the one shown in FIG. 13, except that a front wall 90 of the ballast compartment 82 is extended to side walls of the container, so as to provide two additional storage compartments 92, 94. Advantageously, by containing ballast in the ballast compartment 82 which is mounted lower than a centre of gravity of the trailer without ballast, the centre of gravity is lowered to improve stability of the trailer.

Returning to FIG. 12, the coupling 14 attaches to either side of a hub of a rear wheel of the bicycle to which the trailer is to be attached, and is connected to the chassis 20 of the base 12 by way of a joint 74 which allows rotation of the coupling 14 about two axes relative to the base 12 so that the bicycle with trailer attached is able to round corners and traverse bumps. In other examples, other kinds of couplings, such as those which attach to a seat post of the bicycle, may be used.

Figure 12:
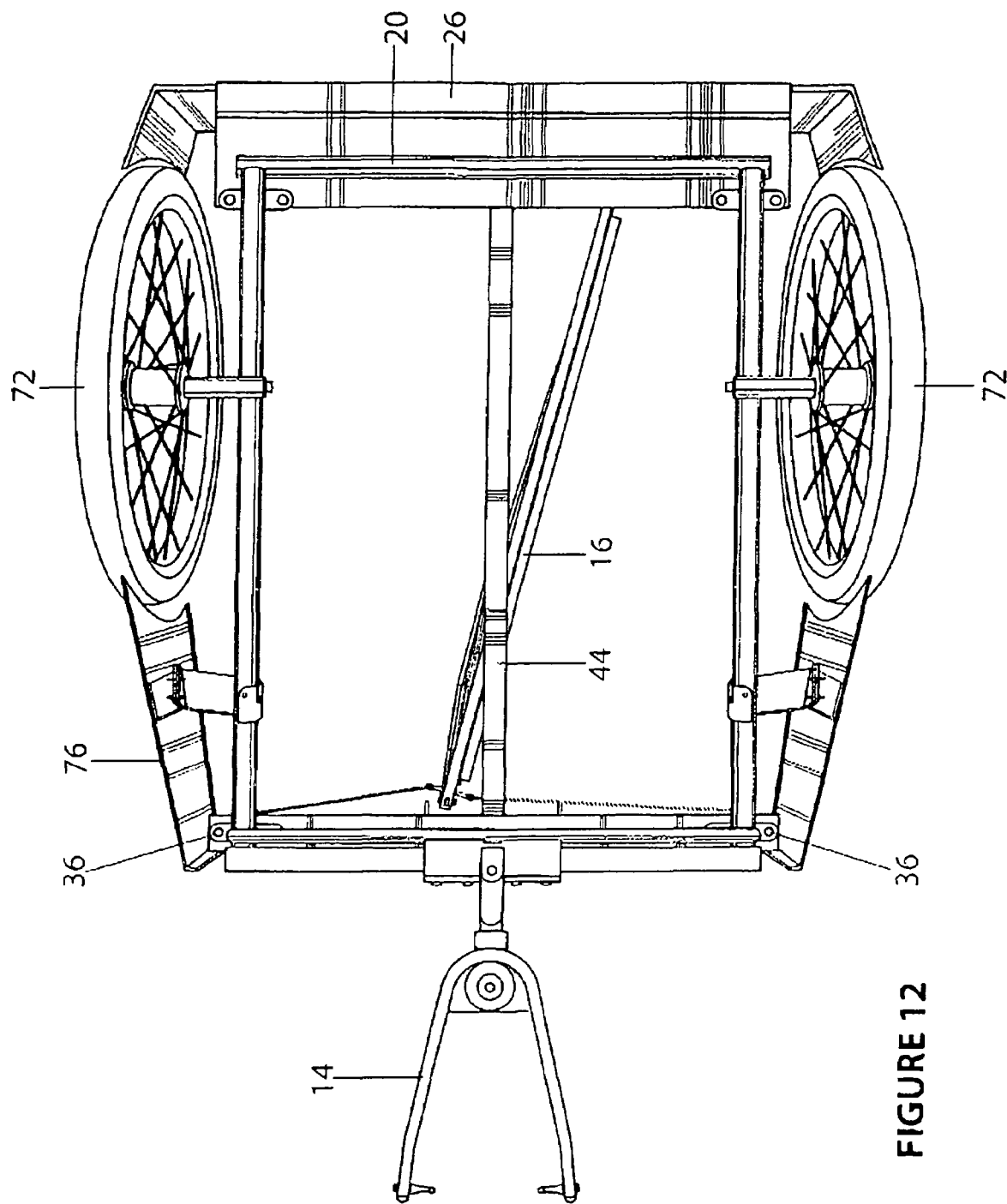
FIG. 12 is a view of an underside of the trailer of FIGS. 1 to 11.

The base 12 is also provided with fairing 76 which is attached to the chassis 20 and the front and rear plate members 24, 30 as shown in FIG. 12 so as to improve aerodynamics of the trailer 10, as well as creating an aesthetically pleasing appearance. The chassis 20 is also provided with a rest bar 78 on which the trailer may be rested (as shown in FIG. 1) when decoupled from the bicycle.

Advantageously, the trailer 10 is able to provide desirable advertising space at sporting events, such as triathlons and bicycle races, as well as on bicycle tracks and roads where the unique sight of a sign towed by a bicycle would serve to attract attention to the advertiser. Of course, the trailer 10 may also be used to advertise in other situations and at other kinds of events. As the trailer 10 is towed by a bicycle, there is no pollution associated with propulsion of the sign, and the bicycle with trailer attached does not contribute to congestion of motor traffic because it is able to overtake cars by virtue of its slim design. Moreover, advertising shown on the trailer is likely to gain positive exposure to viewers who can associate the "pollution-free" and "fitness" aspects of cycling with the advertising.

Also advantageously, the structure of the trailer is lightweight and compact such that it is designed only to carry the advertising sign. The lightweight aspect of the trailer facilitates towing of the trailer by the bicycle, particularly up hills and/or for long distances.

The above trailer has been described by way of example only and modifications are possible within the scope of the invention. For example, although the stub axles 42 are placed relative to the advertising sign 16 such that the sign 16 extends either side of the pivot axis 46, in other examples the stub axles 42 may be placed further forward such that the pivot axis is at or forwardly of a leading edge of the advertising sign 16. By having the advertising sign extend on either side of the pivot axis 46 (as shown in FIGS. 1 to 12), the arrangement is made more compact such that the areas of movement of the leading and trailing edges of the sign 16 have shorter radii, thus facilitating a slim design of the trailer.

What is claimed is:

1. An advertising display trailer adapted for towing by a bicycle, the trailer comprising:
    a base;
    a coupling for attaching the base to the bicycle;
    a pivotal display comprising a frame and an advertising sign, the frame being fixedly mounted substantially perpendicularly to the base and coplanar with a plane that longitudinally bisects the trailer, the frame pivotally carrying the advertising sign on a pivot axis that is offset from a central axis of the frame such that the sign is pivotal relative to the frame and base to either side of the frame, the advertising sign being biased to the base at opposite sides of the pivot axis so as maintain the advertising sign in a substantially coplanar orientation with the frame but to allow controlled rotation of the advertising sign about the pivot axis in response to wind force against the advertising sign so as to prevent tipping of the trailer.

2. A display trailer as claimed in claim 1, wherein the pivot axis is parallel to the central axis of the sign.

3. A display trailer as claimed in claim 2, wherein the sign extends either side of the pivot axis.

4. A display trailer as claimed in claim 3, wherein the trailer includes a biasing element which opposes pivoting of the sign relative to the base.

5. A display trailer as claimed in claim 4, wherein the the sign is biased to a rest position.

6. A display trailer as claimed in claim 5, wherein when the sign is in the rest position, it lies in a plane substantially parallel to a forward direction of travel of the bicycle.

7. A display trailer as claimed in claim 6, wherein the the sign is biased relative to the base with a force which increases in magnitude with pivotal displacement of the display body from the rest position.

8. A display trailer as claimed in claim 7, wherein the sign is pivotal about a substantially vertical axis.

9. The advertising display trailer of claim 1 further comprising a storage container, the container being adapted to store cargo and/or ballast for placement within the base of the trailer beneath the display.

10. An advertising display trailer adapted for towing by a bicycle, the trailer comprising:
    a base comprising a storage container;
    a coupling for attaching the base to the bicycle;
    a display comprising a frame and an advertising sign, the frame being fixedly mounted substantially perpendicularly to the base and coplanar with a plane that longitudinally bisects the trailer, the frame pivotally carrying the advertising sign on a pivot axis that is offset from a central axis of the frame such that the sign is pivotal relative to the frame and base to either side of the frame, the advertising sign being biased to the base at opposite sides of the pivot axis so as maintain the advertising sign in a substantially coplanar orientation with the frame.

11. A display trailer as claimed in claim 9, wherein the container has a compartment for containing ballast centrally beneath the display.

12. An advertising display trailer as claimed in claim 10, wherein the storage container comprises a compartment for holding ballast centrally beneath the frame.

* * * * *

UNITED STATES PATENT AND TRADEMARK OFFICE
CERTIFICATE OF CORRECTION

| | |
|---|---|
| PATENT NO. | : 7,617,626 B2 |
| APPLICATION NO. | : 11/398066 |
| DATED | : November 17, 2009 |
| INVENTOR(S) | : Marcus Antony Balscheit |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Nineteenth Day of October, 2010

David J. Kappos
*Director of the United States Patent and Trademark Office*